United States Patent
Wu et al.

(10) Patent No.: US 8,489,159 B2
(45) Date of Patent: *Jul. 16, 2013

(54) MOBILE COMMUNICATION DEVICE

(75) Inventors: Kun-Tsan Wu, Shindian (TW); Wei-Shan Hu, Shindian (TW)

(73) Assignee: FIH (Hong Kong) Limited, Kowloon (HK)

( * ) Notice: Subject to any disclaimer, the term of this patent is extended or adjusted under 35 U.S.C. 154(b) by 408 days.

This patent is subject to a terminal disclaimer.

(21) Appl. No.: 12/774,837

(22) Filed: May 6, 2010

(65) Prior Publication Data

US 2011/0156557 A1      Jun. 30, 2011

(30) Foreign Application Priority Data

Dec. 30, 2009 (CN) .......................... 2009 1 0312828

(51) Int. Cl.
*H04M 1/00* (2006.01)

(52) U.S. Cl.
USPC .................. 455/575.4; 455/575.1; 455/575.3; 455/90.3

(58) Field of Classification Search
USPC ... 455/575.1, 575.3, 575.4, 90.3; 361/679.01, 361/679.21, 679.55, 679.56; 345/184, 650, 345/156

See application file for complete search history.

(56) References Cited

U.S. PATENT DOCUMENTS

| 2008/0161075 A1* | 7/2008 | Kim et al. ................ 455/575.4 |
| 2008/0230437 A1* | 9/2008 | Ou et al. ................... 206/701 |

* cited by examiner

*Primary Examiner* — Manpreet Matharu
(74) *Attorney, Agent, or Firm* — Altis Law Group, Inc.

(57) ABSTRACT

A mobile communication device having a first side and an opposite second side, comprising a lower housing, an upper housing, a bracket, a biasing assembly and a slide enabling member. The upper housing stacked on the lower housing, the upper housing comprising a first edge located at the first side and a second edge located at the second side. The bracket is pivotably connected between the lower housing and the upper housing, to tilt the first edge of the upper housing away from the lower housing. The biasing assembly is connected directly between the lower housing and the upper housing, to exert a force between the lower housing and the upper housing so that the bracket rotates to tilt the first edge of the upper housing away from the lower housing. The slide enabling member slidably coupling the biasing assembly to the lower housing.

17 Claims, 4 Drawing Sheets

MOBILE COMMUNICATION DEVICE

CROSS-REFERENCE TO RELATED APPLICATIONS

This application is related to co-pending U.S. patent application Ser. Nos. 12/774,833 and 12/774,835, entitled "MOBILE COMMUNICATION DEVICE", by Wu et al. These applications have the same assignee as the present application and have been concurrently filed herewith. The above-identified applications are incorporated herein by reference.

BACKGROUND

1. Technical Field

This disclosure relates to slide and tilt mechanisms, particularly to slide and tilt mechanisms used in an electronic device.

2. Description of Related Art

As electronic devices continue to become more sophisticated, these devices provide an increasing amount of functionality by including such applications as, for example, a mobile phone, digital camera, video camera, navigation system, gaming capabilities, and Internet browser applications. Many of these devices with increased functionality have different configurations corresponding to use with the different functions. Fold and slide mechanisms have been widely used in different kinds of mobile electronic devices to accommodate these different configurations.

However in the conventional product configurations, the sliding and tilting mechanisms are clearly complicated and provide size inefficiencies as they tend to take up a lot of space.

Therefore, there is a room for improved in the arts.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the exemplary slide and tilt mechanism for electronic device. Moreover, in the drawings like reference numerals designate corresponding parts throughout the several views. Wherever possible, the same reference numbers are used throughout the drawings to refer to the same or like elements of an embodiment.

DETAILED DESCRIPTION

Figure 1:
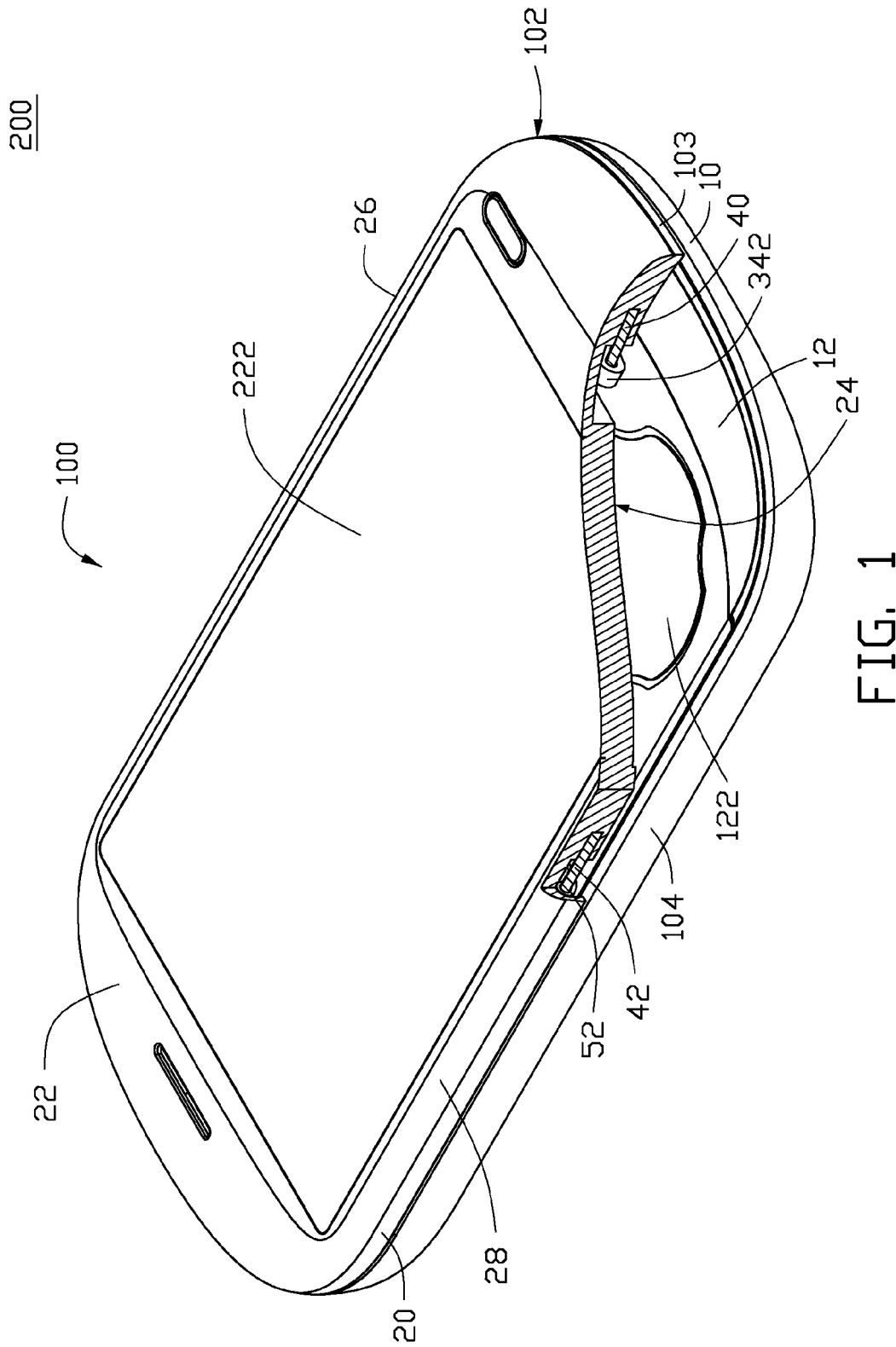
FIG. 1 is an exemplary partially cut-away view of an electronic device in a closed configuration.
Figure 2:
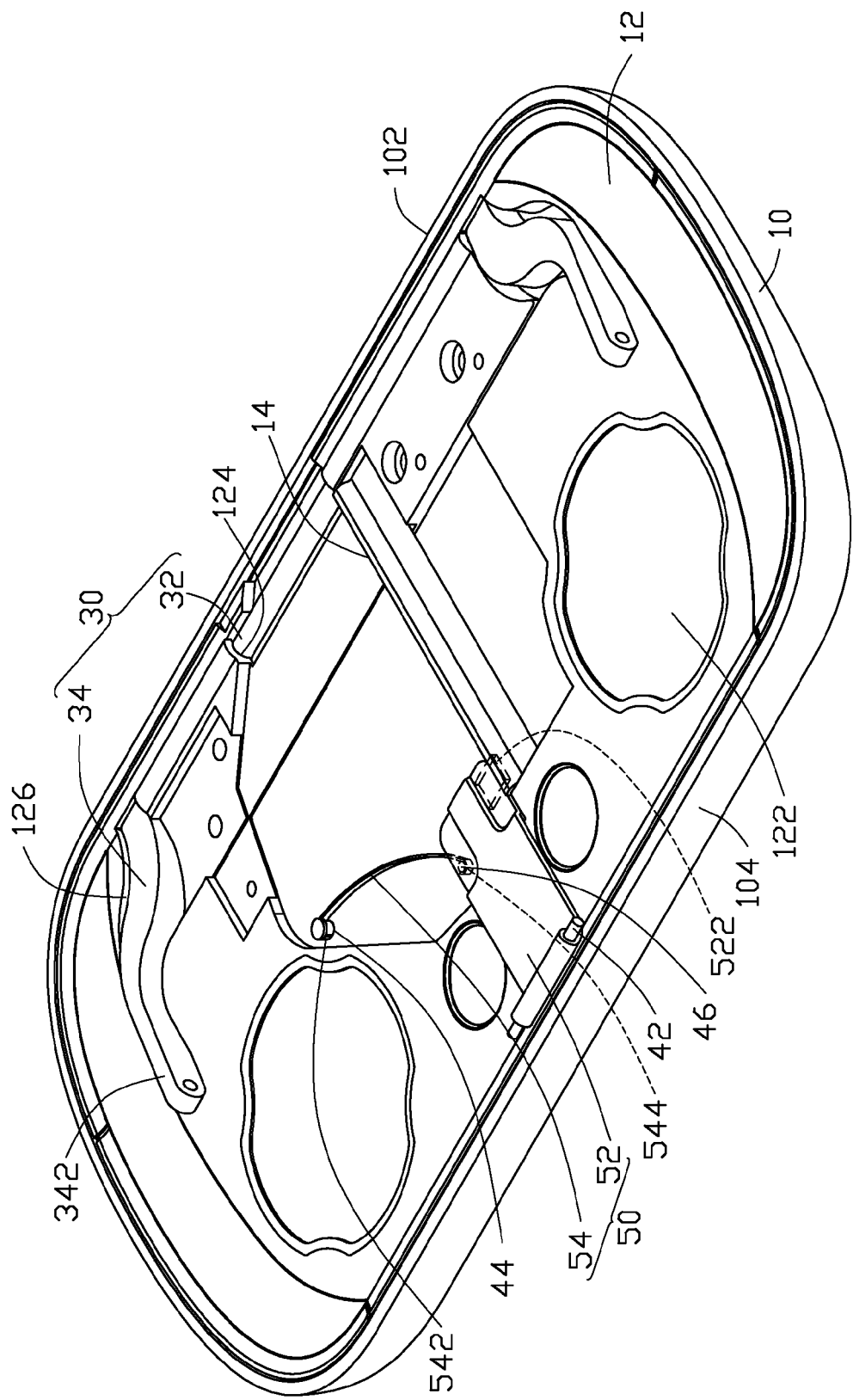
FIG. 2 is an exemplary perspective view of the electronic device in the closed configuration, but an upper housing is shown in cutaway for the sake of clarity.
Figure 3:
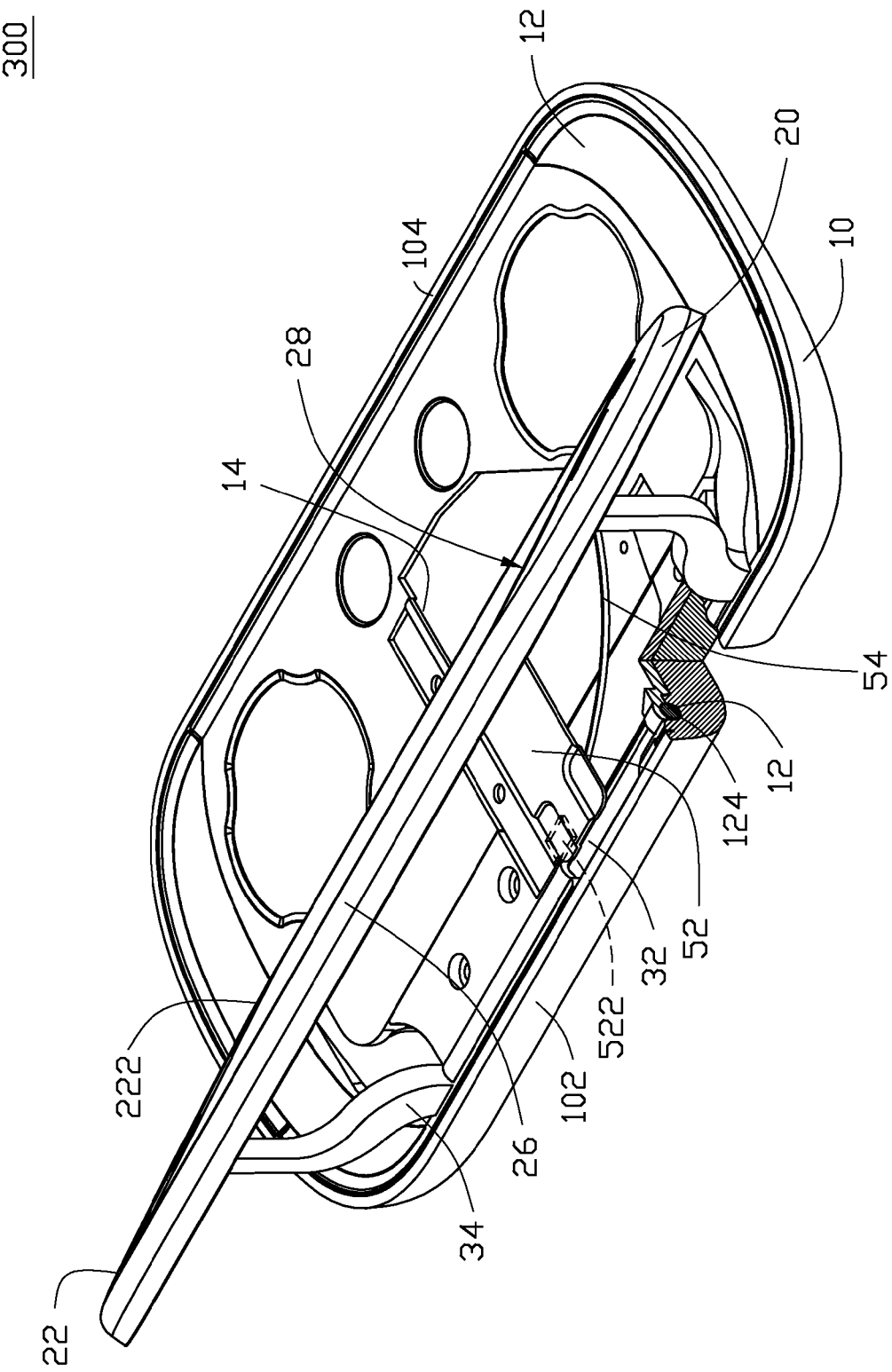
FIG. 3 is an exemplary perspective and partially cut-away view of the electronic device in a tilted configuration.

An embodiment of an electronic device 100 incorporating a slide and tilt mechanism is shown in FIGS. 1-3. FIG. 1 illustrates a partially cut-away view of the electronic device 100 in a compact, closed or retracted configuration 200. FIG. 2 illustrates a perspective view of the electronic device 100 in the closed configuration 200 shown in FIG. 1, but for the sake of clarity, an upper housing 20 of the electronic device 100 is shown in cutaway to further illustrate the other features of the disclosed electronic device 100. FIG. 3 illustrates a schematic view of the electronic device 100 in an open or tilted configuration 300.

The exemplary device 100, which may be a radiotelephone in this case, includes a lower housing 10 and an upper housing 20. In the closed configuration 200, the lower housing 10 and the upper housing 20 are planarly adjacent (i.e. overlapping). In the tilted configuration 300, the upper housing 20 is tilted relative to the lower housing 10 to allow for better viewing of a display screen.

The lower housing 10 comprises a user input region 122 at an upper surface 12 of the lower housing 10. The user input region 122 may be a key board, a keypad, or key mat, for example. However, it should be noted that alternate embodiments may provide any suitable type of user input region 122. The user input region 122 is visible and accessible when the device is in the tilted configuration 300 shown in FIG. 3.

The upper housing 20 comprises a display 222 at a top surface 22 of the upper housing 20. The display 222 is visible when the device is in the closed configuration or the tilted configuration 300. In the tilted configuration 300, the upper housing 20 is tilted relative to the lower housing 10 to allow for better viewing of the display 222 while a user is using the user input region 122. It is to be noted that although the figures illustrate the lower housing 10 comprising the user input region 122 and the upper housing 20 comprising the display 222, alternate embodiments may comprise any suitable location for the user input region 122 and display 222. Additionally, more than one user input region 122 and/or display 222 may be provided.

The upper housing 20 is connected to the lower housing 10 via a bracket 30. The bracket 30 comprises a joint 32 that may be a cylindrical shaft which is pivotably positioned at the upper surface 12 of the lower housing 10 near a first side 102 of the device 100. The bracket 30 further comprises arm members 34 located at opposite ends of the joint 32 respectively. Each of the arm members 34 comprises a distal end 342 pivotably connected to a lower surface 24 of the upper housing 20 by a shaft 40 near a middle portion 103 of the device 100, which allows for rotating or pivoting of the arm members 34 between the closed configuration 200 and the tilted configuration 300. The arm members 34 pivot such that the distal end 342 of the arm members 34 rotate about the joint 32 and away from the lower housing 10, which places a first edge 26 of the upper housing 20 located at first side 102 of the device 100 above the lower housing 10, i.e., the first edge 26 of the upper housing 20 is tilted above the lower housing 10. In this embodiment, the lower housing 10 has a joint engaging member (e.g. a hole 124) defined at the upper surface 12 of the lower housing 10 for rotatably accommodating the joint 32 of the bracket 30 so that the bracket 30 is pivotably connected to the lower housing 10.

Figure 4:
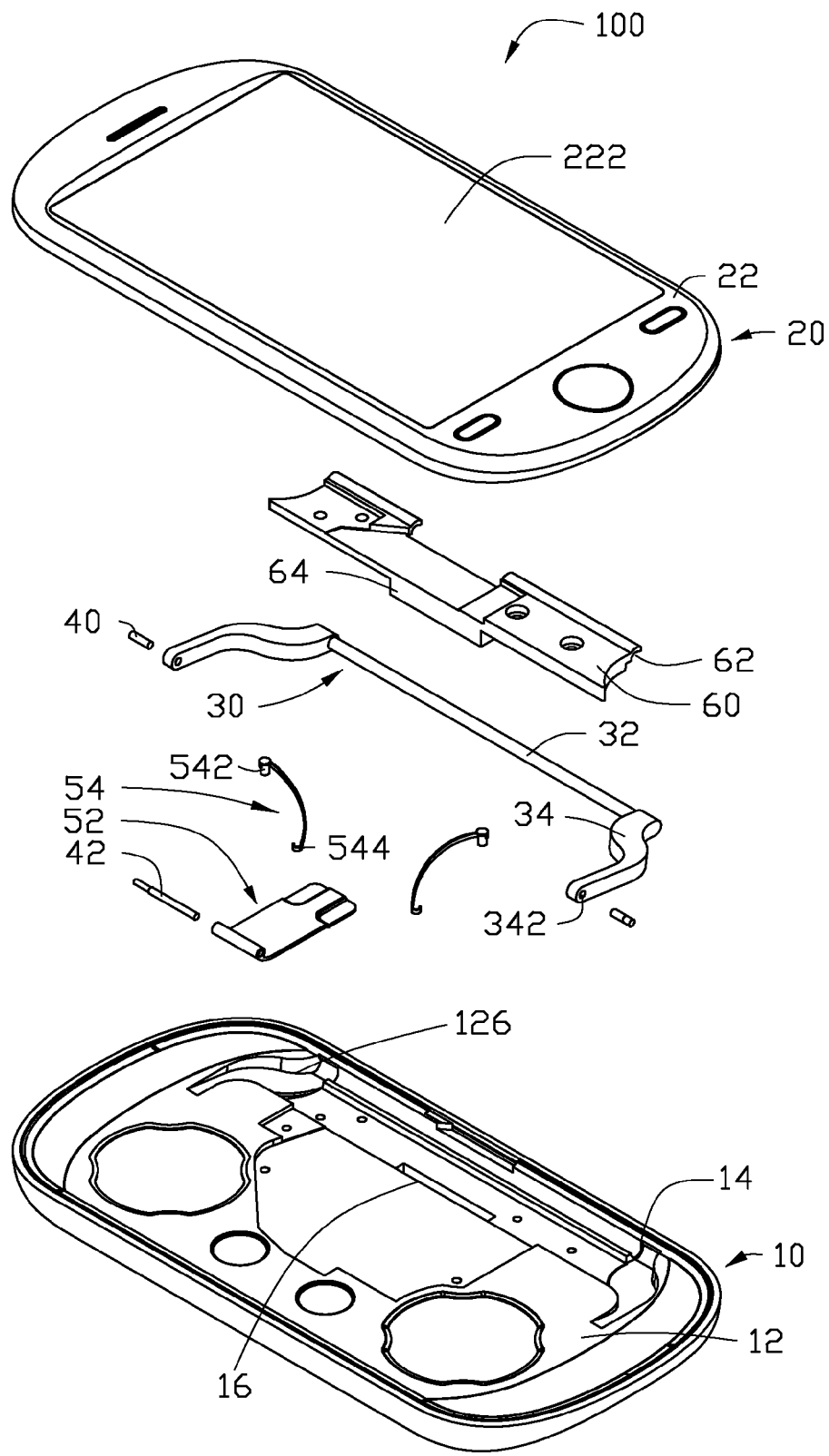
FIG. 4 is an exemplary exploded view of the electronic device.

In another embodiment, referring to FIG. 4, the joint engaging member may be defined by an first arcuate groove 14 defined at the upper surface 12 of the lower housing 10 and a second arcuate groove 62 defined a separating block 60 that is coupled to the lower housing 10. In this other embodiment, the joint 32 of the bracket 30 is first positioned in the first arcuate groove 14, the block 60 is then coupled to the lower housing 10, such that the first arcuate groove 14 and the second arcuate groove 62 enclose the joint engaging member to rotatably accommodate the joint 32 therein. It is to be understood, that a positioning member (not labeled) may be coupled between the block 60 and the lower housing 10 to facilitate coupling the block 60 to the lower housing 10. The positioning member may include a positioning pole 64 and a positioning trough 16 that engages the positioning pole 64. The positioning pole 64 is positioned on the block 60 facing the lower housing 10, and the positioning trough 16 is positioned on the lower housing 10 facing the block 60 and is complementary in shape to the positioning pole 16. When the block 60 is coupled to the lower housing 10, the positioning pole 64 is first aligned with the positioning trough 16, then slides into the positioning trough 16, i.e., the block 60 is slid along the positioning pole 64 relative to the lower housing 10 such that the block 60 is precisely positioned on the lower housing 10 to define the joint engaging member.

The lower housing 10 further includes two slots 126 located corresponding to the arm members 34, respectively. The slots 126 provide openings within the lower housing 10 which are suitably sized and shaped to receive the arm members 34 when the device 100 is in the closed configuration 200. The slots 126 may only be provided on one side of the joint 32, this allows for the other side of the joint 32 to serve as a stopper mechanism which prevent further rotating of the arm members 34 when the device 100 is in the tilted configuration 300.

The device 100 further includes a biasing assembly 50 coupled between the lower housing 10 and the upper housing 20. The biasing assembly 50 exerts a force between the lower housing 10 and the upper housing 20, causing the bracket 30 to rotate about the joint 32 so that the upper housing 20 tilts relative to the lower housing 10 for better viewing of the display 222. In this embodiment, the biasing assembly 50 includes a slider board 52 and two resilient members 54 (e.g. torsion spring) that connect the slider board 52 to the lower housing 10. One end of the slider board 52 is pivotably connected to the lower surface 24 of the upper housing 20 adjacent to a second side 104 of the device 100 opposite to the first side 102 via a shaft 42. Each resilient member 54 has a first end 542 pivotably or nonrotatably connected to the upper surface 12 of the first housing by a shaft 44, and a second end 544 pivotably or nonrotatably connected to the other end of the slider board 52 by a shaft 46. The biasing assembly 50 also may be used for damping and/or biasing or latching the device 100 in the closed and/or open configuration. It is to be note that the biasing assembly 50 further acts as a retaining mechanism in such a manner that the resilient members 54/slider board 52 combination prevent a second edge 28 of the upper housing 20 located at the second side 104 of the device 100 and the upper surface 12 of the lower housing 10 from separating. In other words, the biasing assembly 50 forces the second edge 28 into contact with the upper surface 12 of the lower housing 10.

The device 100 further includes a slide enabling member shown in FIG. 3. The exemplary slide enabling member provides a mechanism for the slider board 52 to slidably engage the lower housing 10. In this embodiment, the slider board 52 is slidably engaged to the lower housing 10. The slide enabling member, in this embodiment, comprises a rail 522 and a track 14 that engages the rail 522. The rail 522 is carried on the slider board 52 and the track 14 is carried on the lower housing 10. The slider board 52 slides along the rail 522 between the closed configuration 200 and the tilted configuration 300. It is understood that one of ordinary skill in the art will appreciate that the rail 522 and the track 14 combination only is an example for the slide enabling member. It is also understood that the rail 522 may be carried on either the slider board 52 or the lower housing 10 and the rail engaging members (e.g. track 14) may be carried on the element that the rail 522 is not carried on.

It is to be understood, however, that even through numerous characteristics and advantages of the exemplary invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A mobile communication device having a first side and an opposite second side, comprising:
   a lower housing;
   an upper housing comprising a first edge corresponding to the first side of the mobile communication device and a second edge corresponding to the second side of the mobile communication device;
   a bracket pivotably connected between the lower housing and the upper housing, wherein the bracket is configured to tilt the first edge of the upper housing away from the lower housing;
   a biasing assembly connected directly between the lower housing and the upper housing, wherein the biasing assembly is configured to exert a force between the lower housing and the upper housing so that the bracket may rotate to tilt the first edge of the upper housing away from the lower housing; the biasing assembly comprising a slider board, one end of the slider board being pivotably connected to the second edge of the upper housing; and
   a slide enabling member comprising a rail formed on the slider board, and a track formed on the lower housing, the rail slidably engaging with the track to allow the slider board to slide relative to the lower housing for guiding the second edge of the upper housing to slidably move along the lower housing;
   wherein when the upper housing is slid relative to the lower housing, the rail of the slider board is slid along the track and the upper housing rotates relative to the slider board, the bracket supports the upper housing relative to the lower housing in a tilted position.

2. The mobile communication device as claimed in claim 1, wherein the bracket comprises a joint pivotably positioned at the lower housing near the first side of the mobile communication device.

3. The mobile communication device as claimed in claim 2, wherein the bracket further comprises arm members located at opposite ends of the joint respectively; each arm member comprises a distal end pivotably connected to the upper housing.

4. The mobile communication device as claimed in claim 3, wherein the mobile communication device further comprises a middle portion at which the distal ends of the arm members are located.

5. The mobile communication device as claimed in claim 1, wherein the biasing assembly further comprises two resilient members, each resilient member has a first end connected to the lower housing, and a second end connected to the other end of the slider board.

6. A mobile communication device having a first side and an opposite second side, comprising:
   a lower housing;
   an upper housing stacked on the lower housing, the upper housing comprising a first edge located at the first side of the mobile communication device and a second edge located at the second side of the mobile communication device;
   a bracket pivotably connected between the lower housing and the upper housing;

a biasing assembly connected between the lower housing and the upper housing, the biasing assembly comprising a slider board, one end of the slider board being pivotably connected to the second edge of the upper housing; and a slide enabling member comprising a rail formed on the slider board, and a track formed on the lower housing, the rail slidably engaging with the track to couple the slider board to the lower housing;

wherein the bracket is configured to tilt the first edge of the upper housing above the lower housing; when the first edge of the upper housing is tilted above the lower housing, the biasing assembly is configured to exert a contact force between the second edge of the upper housing and the lower housing, and the slider board is slid relative to the lower housing via the slide enabling member.

7. The mobile communication device as claimed in claim 6 wherein the bracket comprises a joint pivotably positioned at the lower housing near the first side of the mobile communication device.

8. The mobile communication device as claimed in claim 7, wherein the bracket further comprises arm members located at opposite ends of the joint respectively; each arm member comprises a distal end pivotably connected to the upper housing.

9. The mobile communication device as claimed in claim 8, wherein the mobile communication device further comprises a middle portion at which the distal ends of the arm members are located.

10. The mobile communication device as claimed in claim 6, wherein the biasing assembly further comprises two resilient members, each resilient member has a first end connected to the lower housing, and a second end connected to the other end of the slider board.

11. The mobile communication device as claimed in claim 10, wherein each resilient member is a torsion spring.

12. A mobile communication device having a first side and an opposite second side, comprising:

a lower housing;

an upper housing stacked on the lower housing, the upper housing comprising a first edge located at the first side of the mobile communication device and a second edge located at the second side of the mobile communication device when the lower housing and the upper housing are in a closed configuration;

a bracket pivotably connected between the lower housing and the upper housing, such that when the lower housing and the upper housing are in the closed configuration, the bracket is configured to tilt the first edge of the upper housing away from the lower housing to a tilted configuration;

a biasing assembly connected between the lower housing and the upper housing, biasing the first edge of the upper housing to tilt away from the lower housing with respect to the bracket when the upper housing is tiled from the closed configuration to the tilted configuration; the biasing assembly comprising a slider board, one end of the slider board being pivotably connected to the second edge of the upper housing; and a slide enabling member comprising a rail formed on the slider board, and a track formed on the lower housing, the rail slidably engaging with the track to allow the slider board to slide relative to the lower housing;

wherein when the upper housing is slid relative to the lower housing, the rail of the slider board is slid along the track and the upper housing rotates relative to the slider board, the bracket supports the upper housing relative to the lower housing in a tilted position.

13. The mobile communication device as claimed in claim 12, wherein the biasing assembly is configured to latch the upper housing and the lower housing in the closed configuration and in the open configuration.

14. The mobile communication device as claimed in claim 12, wherein the biasing assembly further is configured to prevent the second edge of the upper housing and the lower housing from separating when the upper housing is tilted from the closed configuration to the open configuration.

15. The mobile communication device as claimed in claim 12, wherein the bracket comprises a joint pivotably positioned at the lower housing near the first side of the mobile communication device.

16. The mobile communication device as claimed in claim 15, wherein the bracket further comprises arm members located at opposite ends of the joint respectively; each arm member comprises a distal end pivotably connected to the upper housing.

17. The mobile communication device as claimed in claim 12, wherein the biasing assembly further comprises two resilient members, each resilient member has a first end connected to the lower housing, and a second end connected to the other end of the slider board.

* * * * *